(12) United States Patent
Eldessouky

(10) Patent No.: US 9,586,277 B2
(45) Date of Patent: Mar. 7, 2017

(54) FLUSH GRINDER BIT

(71) Applicant: Ali W Eldessouky, Boston, MA (US)

(72) Inventor: Ali W Eldessouky, Boston, MA (US)

( * ) Notice: Subject to any disclaimer, the term of this patent is extended or adjusted under 35 U.S.C. 154(b) by 4 days.

(21) Appl. No.: 14/864,359

(22) Filed: Sep. 24, 2015

(65) Prior Publication Data
US 2016/0082532 A1 Mar. 24, 2016

Related U.S. Application Data

(60) Provisional application No. 62/054,690, filed on Sep. 24, 2014.

(51) Int. Cl.
*B23D 61/18* (2006.01)
*B24B 7/10* (2006.01)

(52) U.S. Cl.
CPC .............. *B23D 61/18* (2013.01); *B24B 7/10* (2013.01)

(58) Field of Classification Search
CPC .. B23D 61/18; B24B 7/10; B24B 7/18; B24D 5/126; B28D 5/028
USPC .............. 451/54, 57, 65, 461–462, 358–359
See application file for complete search history.

(56) References Cited

U.S. PATENT DOCUMENTS

| | | | |
|---|---|---|---|
| 3,266,199 A * | 8/1966 | Bryson | A61F 6/08 408/1 R |
| 3,831,236 A * | 8/1974 | Coburn | B23C 5/18 407/53 |
| 4,626,143 A * | 12/1986 | Rembold | B23B 51/107 407/50 |
| 4,874,001 A * | 10/1989 | Ferraris | A45D 29/06 132/73 |
| 5,025,593 A * | 6/1991 | Kawaguchi | B23D 59/002 125/13.02 |
| 5,052,153 A * | 10/1991 | Wiand | B24B 13/01 407/119 |
| 5,313,741 A * | 5/1994 | Toyama | B23D 59/001 125/13.02 |
| 5,326,199 A * | 7/1994 | Kleine | B23B 31/008 279/19.3 |
| 5,328,308 A * | 7/1994 | Ducker, III | B23B 31/005 407/30 |
| 5,466,099 A * | 11/1995 | Sullivan | B23B 51/0406 408/145 |
| 5,927,263 A * | 7/1999 | Muramatsu | B28D 5/00 125/13.01 |
| 6,926,598 B2 * | 8/2005 | Toge | B24B 53/017 451/540 |

(Continued)

*Primary Examiner* — George Nguyen
(74) *Attorney, Agent, or Firm* — Cargill & Associates, PLLC; Lynn E. Cargill

(57) ABSTRACT

A flush cut grinder tool bit made of an elongated cylindrical shape with an inwardly facing saw blade within the inner diameter of the elongated cylindrical shape that can be sleeved over a protruding object, such that the cutting saw blade portion of the tool bit is inside the cylindrical tool bit so that when it is sleeved over a protruding object, moving the tool bit back and forth over the protruding object will cut the protruding object off at the surface. The body of the drill bit terminates at its distal end with a flush flange having saw teeth therein, and may include a bit shank suspended in the middle of a drill bit body by spokes or a solid surface radially extending from said bit shank. A method of using such a flush cut grinder tool bit is included.

9 Claims, 6 Drawing Sheets

(56) References Cited

U.S. PATENT DOCUMENTS

| | | | |
|---|---|---|---|
| 8,353,278 B2* | 1/2013 | Plaskett | B28D 1/04 |
| | | | 125/13.01 |
| 8,408,972 B2* | 4/2013 | Kenney | B24B 1/04 |
| | | | 451/28 |
| 2004/0038629 A1* | 2/2004 | Griggs | B23D 61/025 |
| | | | 451/49 |
| 2006/0223427 A1* | 10/2006 | Tsumuraya | B24B 5/40 |
| | | | 451/61 |
| 2010/0159812 A1* | 6/2010 | Schimweg | B24B 33/085 |
| | | | 451/546 |

* cited by examiner

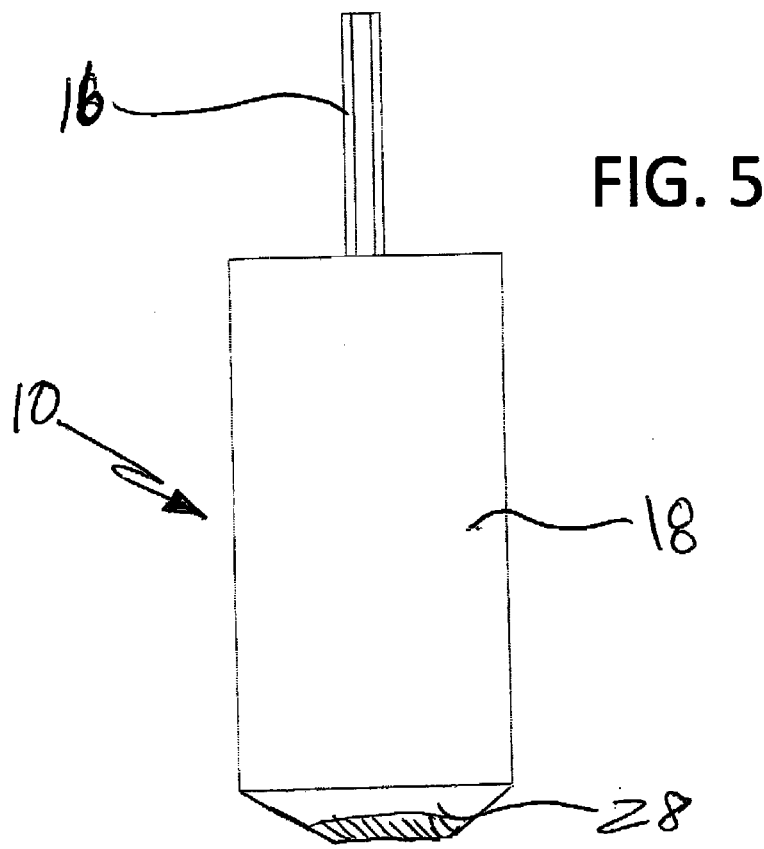
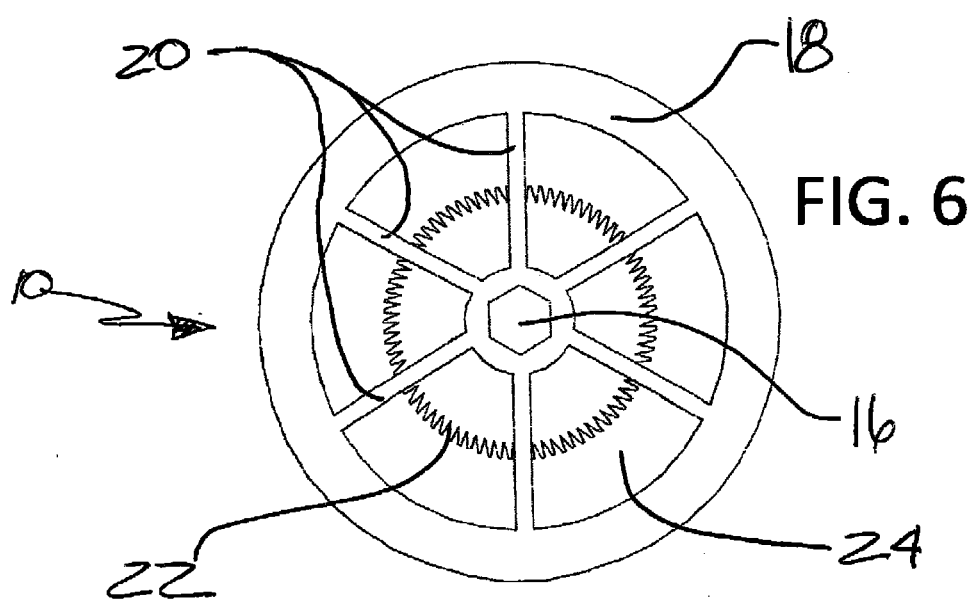

FLUSH GRINDER BIT

CROSS-REFERENCE TO RELATED APPLICATIONS

This application claims the benefit of priority under 35 U.S.C. 119(e) of U.S. Provisional Application No. 62/054,690, filed Sep. 24, 2014.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS WEB)

Not Applicable

BACKGROUND OF THE INVENTION

1. Field of the Invention

The present invention relates to a drill bit, methods of manufacturing same, and methods of using same. More particularly, the invention relates to a flush grinder tool bit for flush cutting a protruding nail or other object from a surface, such as a board.

2. Description of the Prior Art

Conventional cut-off tools are well known in the art, including one of the most common types of cut-off tools, a SawzAll® that includes an exposed blade. SawzAll is a registered trademark of Milwaukee Electric Tool Corporation of Brookfield, Wisconsin.

However, practitioners of those inventions have become aware of certain problems which are presented by those prior art inventions. One particular problem that has plagued users has been that, once the nail or other protruding object is sawn off, yet another operation is needed, i.e. that being a need to finish the job by grinding down the rough cut surface left behind. This surface is rough and dangerous and must be ground smooth.

There are complexities which give rise to sharp edges left after a cut-off tool is used, necessitating an additional operation of grinding to smooth off the sharp edge.

It would be desirable to the remodeling and construction industry if there was provided a flush grinder tool bit, and a method of using the same.

SUMMARY OF THE INVENTION

In accordance with the above-noted desires of the industry, the present invention provides various aspects, including a flush grinder bit and a method of using it. This includes a flush grinder bit that will cleanly cut off a protruding nail or other object. This overcomes most, if not all, of the aforementioned problems with the prior art because the present invention provides a substantially clean cut in one step.

A first aspect of the present invention includes certain features comprising a flush cut grinder tool bit with an inwardly facing saw blade that can be sleeved over a nail or other protruding object, such that the cutting saw blade portion of the tool bit is inside the tool bit so that when it is sleeved over a nail or other protruding object, moving back and forth will cut the nail off. The drill rotation, when combined with light pressure in a downward direction, or in any direction, makes cutting protruding objects much easier, especially when the protruding object is located in a tight space. Such a new drill bit makes cutting off relatively small protuberances much easier than using conventional grinders and cutters. An optional rough surface may be included on the bottom facing surface, such as on a file, in order to provide a sanding surface to sand down any final burrs left over when the nail or other protuberance is sawn off. This all-in-one type of tool is very popular because, for example, you can saw off the nail at the board surface and buzz the rough leftover nail bit with the same tool to a relatively smooth surface without having to get any other tools involved.

In this aspect, in its most basic form, a tool bit comprises a flush cut grinder tool bit made of an elongated cylindrical shape with an inwardly facing saw blade within the inner diameter of the elongated cylindrical shape that can be sleeved over a protruding object, such that the cutting saw blade portion of the tool bit is inside the cylindrical tool bit so that when it is sleeved over a protruding object, moving the tool bit back and forth over the protruding object will cut the protruding object off.

This technique of flush cutting a protruding object from a flat surface may therefore be extended to include not only the cutting of nails and screws, etc., from boards, but also the flush cutting of any protruding objects, such as huge oil drilling bits, geothermal drilling operations, or any other type of commercial enterprise that may need to cut off a protruding object in a restricted area. The relative size of the flush grinder tool bit when compared to the thing being cut off will determine the size of my flush grinder tool bit.

The invention is particularly useful for applications of cutting any protruding object from a surface, such that extensive final grinding is not needed after the cutting operation, like that which would be necessary if a cut-off saw-type tool was utilized. By having the teeth on an inwardly facing surface, my tool bit can be sleeved over anything someone would want to cut off, whether it is big or small. The tool bit could be enlarged to accommodate the size of the protruding object. The additional feature of the bit being able to flush cut is an added bonus. If a rough bottom surface was included, a touch up sanding operation could be implemented as a final step in this method.

Another aspect of this invention is that it is a very low cost alternative to grinders, or a SawzAll®-type of cut-off tool and it can be used to get into very tight spaces that one would have a difficult, if not impossible, time getting into with a SawzAll®-type tool or grinder to remove a protruding object in tight quarters. Another aspect of this drill bit is that you can cut off protruding objects head on and do not need the side space that you would normally need on the sides when using other cutting/grinding tools. For example, consider the situation when a nail is sticking out of a framed wall directly next to the wall perpendicular to it. A cut-off tool would be essentially impossible to use. So, as well, for a grinder. But, the present invention could be sleeved over the nail, and flush cut to the wall without the need to tear into the wall.

Although the invention will be described by way of examples hereinbelow for specific aspects having certain features, it must also be realized that minor modifications that do not require undo experimentation on the part of the practitioner are also covered within the scope and breadth of this invention. Additional advantages and other novel features of the present invention will be set forth in the description that follows and in particular will be apparent to those skilled in the art upon examination or may be learned within the practice of the invention. Therefore, the invention is capable of many other different aspects and its details are capable of modifications of various aspects which will be obvious to those of ordinary skill in the art all without departing from the spirit of the present invention. Accordingly, the rest of the description will be regarded as illustrative rather than restrictive.

BRIEF DESCRIPTION OF THE DRAWINGS

For a further understanding of the nature and advantages of the expected scope and various embodiments of the present invention, reference shall be made to the following detailed description, and when taken in conjunction with the accompanying drawings, in which like parts are given the same reference numerals, and wherein;

FIG. 5 is a side elevational view of the drill bit of FIG. 1;

FIG. 6 is a bottom plan view of the drill bit of FIG. 1; and

Figure 1:
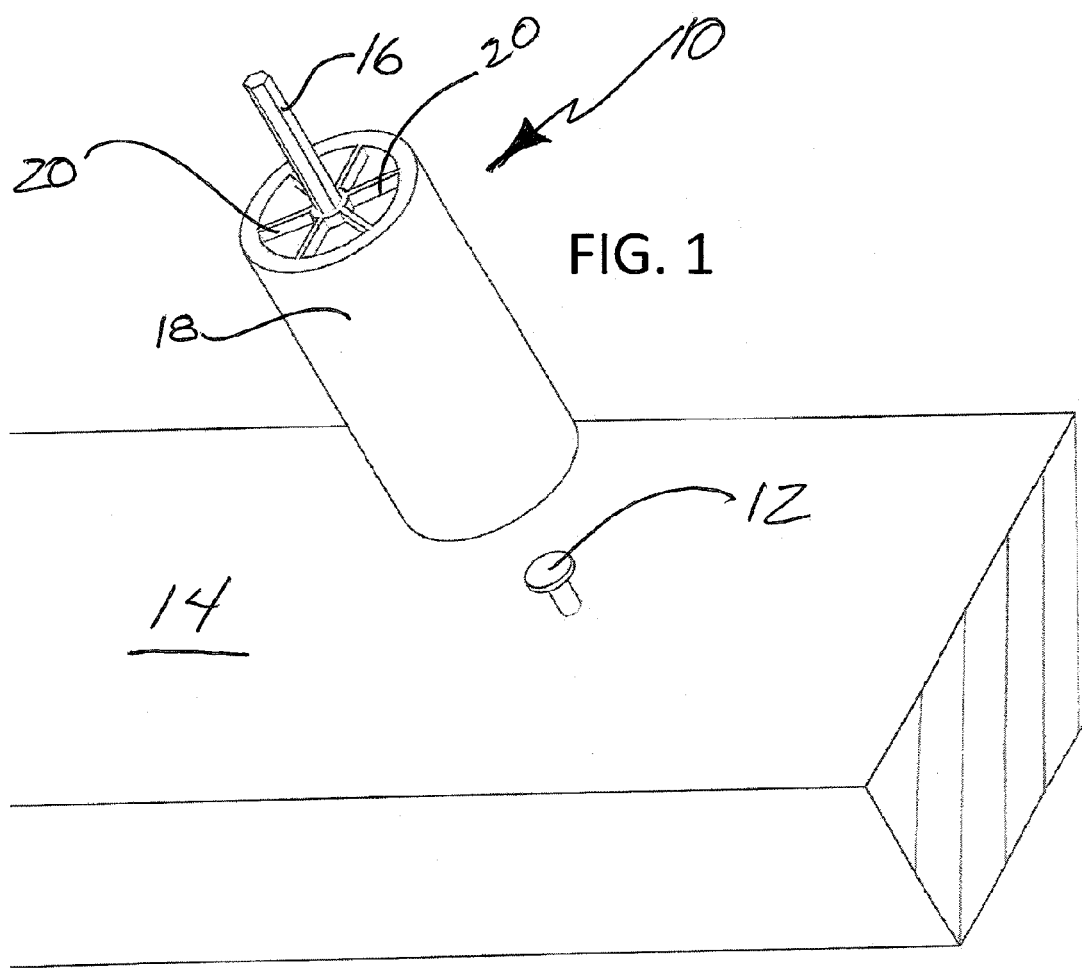
FIG. 1 is an environmental view of a drill bit made in accordance with the present invention.

In summary, numerous benefits have been described which result from employing any or all of the concepts and the features of the various specific aspects of the present invention, or those that are within the scope of the invention. The present drill bit acts well for a smooth cut off of a protruding object.

LIST OF REFERENCE NUMERALS UTILIZED IN THE DRAWINGS

10. Drill bit
12. Nail or screw
14. Board
16. Bit shank
18. Drill bit body
20. Drill bit spokes
22. Teeth
24. Flush flange
28. Chamfer cutter

DETAILED DESCRIPTION OF THE INVENTION

Referring now to the drawings in detail, FIG. 1 is an environmental view of a flush grinder bit generally indicated by the numeral 10, which also includes a bit shank 16. In this aspect of the present invention, a protruding nail 12 extends upwardly from a board 14. Drill bit 10 includes a bit shank 16 suspended in the middle of a drill bit body 18 by spokes 20. Drill bit 10 is sleeved over nail 12 and slid from side to side to cut off nail 12, as described more fully hereinbelow with reference to the other figures.

Figure 2:
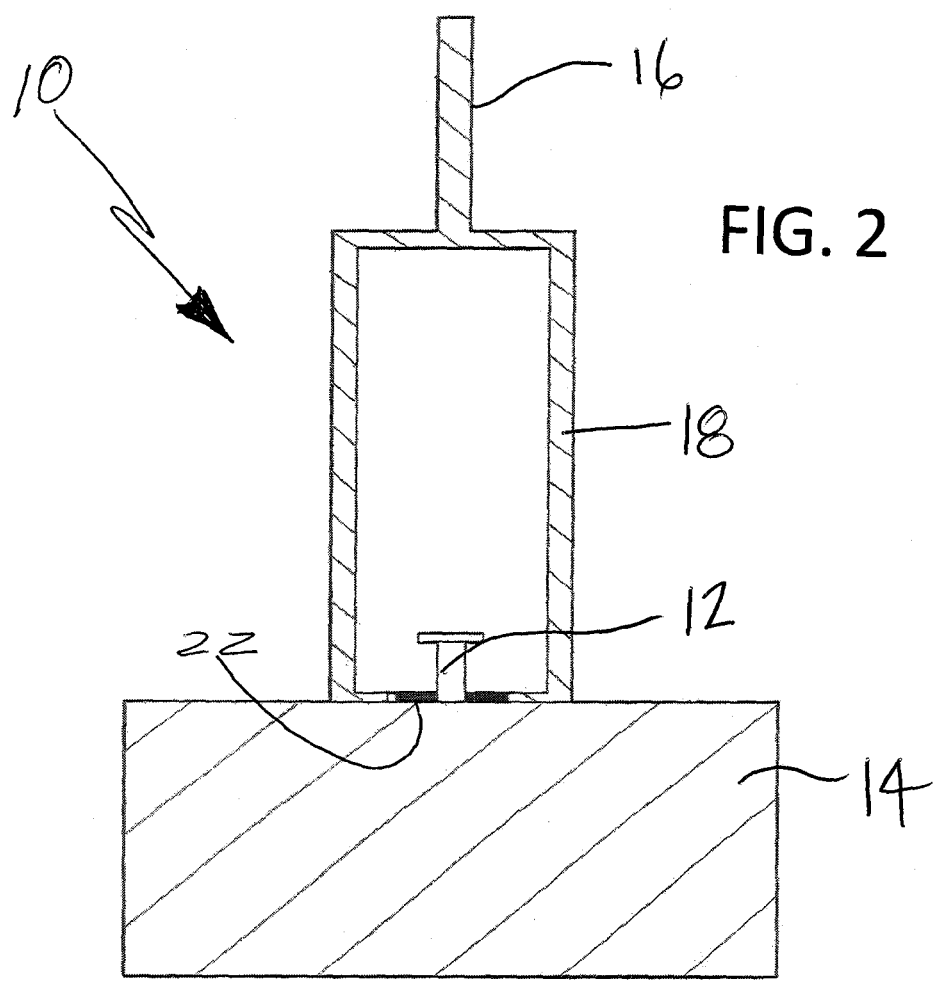
FIG. 2 is a side elevational cut-away view of the drill bit of FIG. 1 demonstrating its positioning over a nail.

FIG. 2 is a side elevational cutaway view of drill bit 10 sleeved over nail 12 extending upwardly from board 14. Drill bit shank 16 is intended to be placed into a conventional hand-held electric drill and is secured by a traditional chuck. As drill bit 10 rotates around, teeth 22 will be slid against nail 12 and will cut off nail 12 flush against the surface of board 14.

Figure 3:
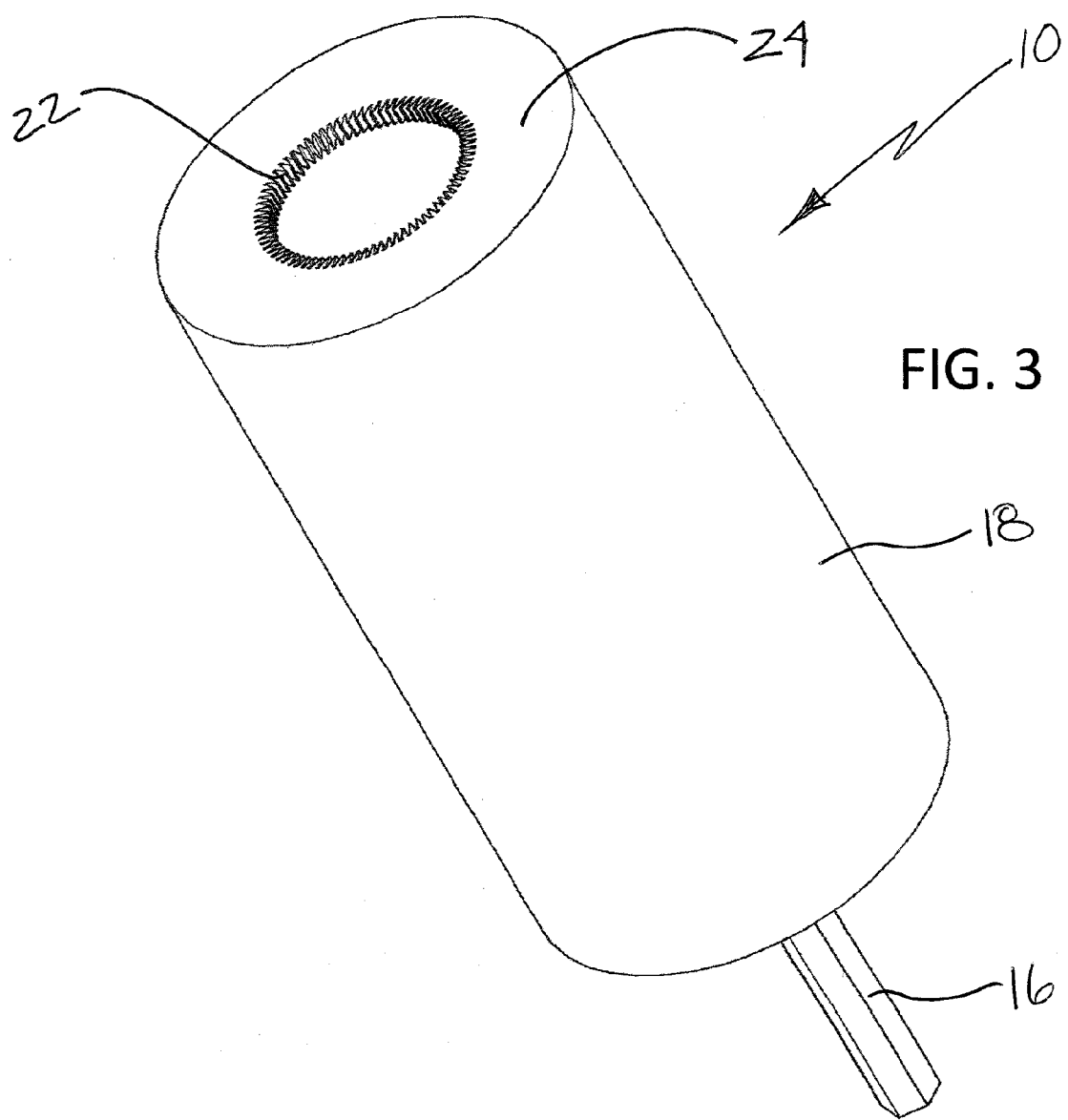
FIG. 3 is a top perspective view of the drill bit of FIG. 1.

FIG. 3 shows a bottom perspective view of the drill bit 10 of the present invention, and shows drill bit body 18 terminating at its distal end with a flush flange 24 having saw teeth 22 therein. Saw teeth 22 will be preferably made of a material that is capable of cutting off metal protruding objects, such as nails, screws or the like.

Figure 4:
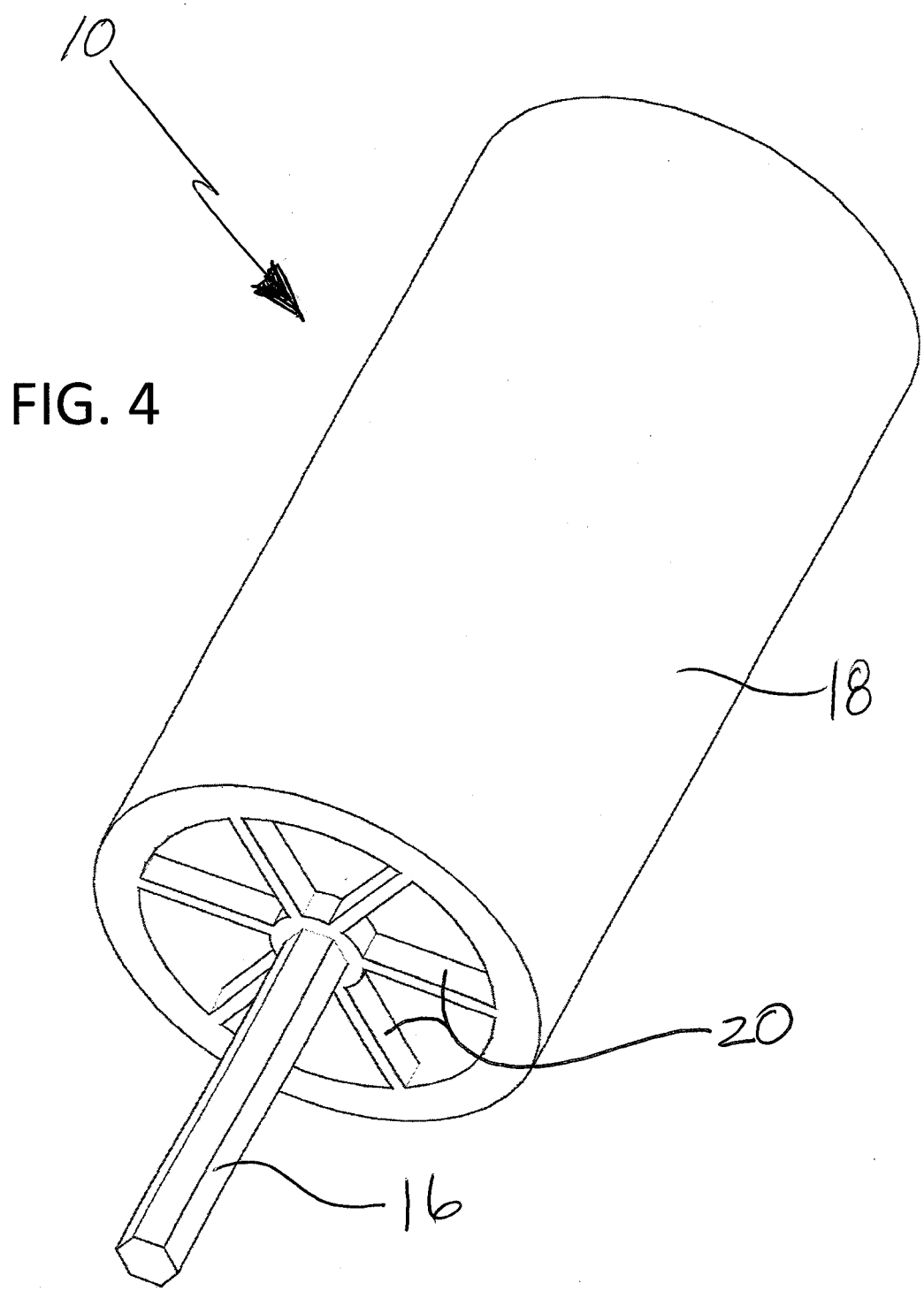
FIG. 4 is a side perspective view of the drill bit of FIG. 1.

FIG. 4 shows yet another view of drill bit 10 with the drill bit body 18 being supported by spokes 20 radially extending from bit shank 16. The spokes 20 shall be strong enough to withstand forces against them to support drill bit body 18 while the saw teeth 22 (not shown here) act to saw off the nail or other protruding object. It is envisioned that the bottom could be either spoked or a solid surface. In the case of a solid surface bottom, a roughened surface, much like the surface of a file or sandpaper, may be included to provide a final sanding of any remaining portion of the nail left over after the cutting operation. No additional tools would be needed.

FIG. 5 shows yet another aspect of the present invention where a side elevational view of drill bit 10 is shown with the relative placement of bit shank 16 and drill bit body 18. As can be seen in FIG. 6, a top plan view of drill bit 10 is shown with the drill bit shank 16 in the center extending upwardly, while spokes 20 support drill bit shank 16 in the center of drill bit body 18. As drill bit body 18 is hollow, looking downwardly through the bit shank 16, one can see the saw teeth 22 and the flush flange 24 at the bottom of FIG. 6. In this aspect of the invention, a countersink bit tip 28 may be used for countersinking into the surface material that has the protruding nail or other object emanating therefrom.

My invention may also be adapted for combination operations, including not only the countersinking and cut off operations, but may also be extended to cutting and polishing operations in the same drill bit.

Figure 7:
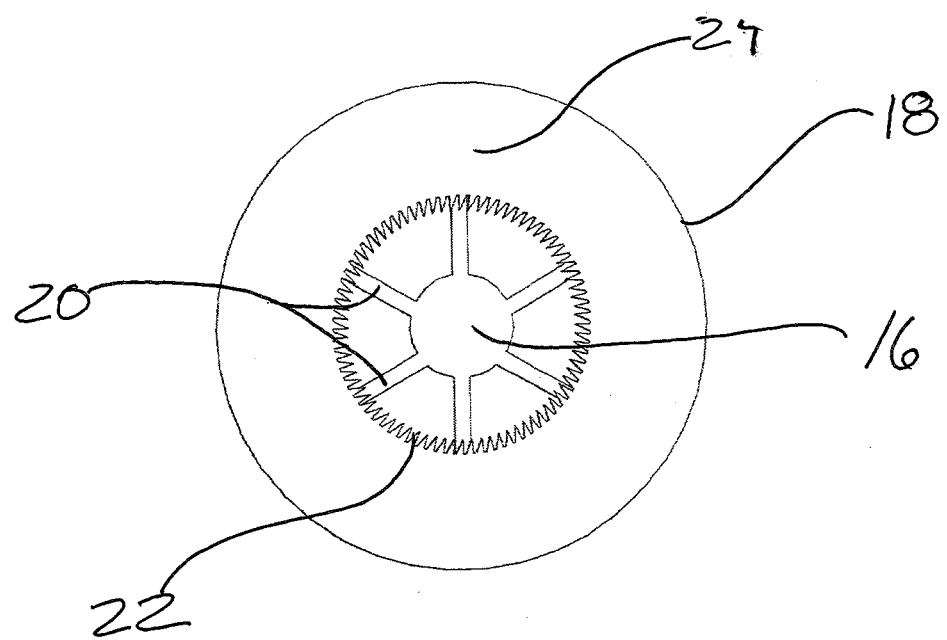
FIG. 7 is a top plan view of the drill bit of FIG. 1.

FIG. 7 is a bottom plan view looking upwardly through the cavity created by drill bit body 18 and flush flange 24 with saw teeth 22 extending inwardly out of flush flange 24. As drill bit body 18 is hollow, one can see spokes 20 through the hollow area in the center, and their attachment to bit shank 16.

While this drill bit may be made of any number of different types of materials, it is preferable that the drill bit be made of 18/10 stainless steel, or its equivalents. One would not like to see a corroded drill bit, so it would be preferable to have it be made of a hardened or tempered steel or stainless steel, or any steel that would provide enough strength to the spokes to support the saw teeth as it turned in the electric hand-held drill.

Although flush flange 12 is designed to provide a flush cut against a flat surface, the present inventor may also envision the use of a chamfered bottom piece in order to cut into the protruding object, while also providing a bit of chamfering in order to countersink the ground protruding object. This could provide a single operation for cutting a protruding object, and then countersinking the protruding object below the flat surface of the board or other material from which it is protruding.

Further, flush flange 12 could have its surface covered with either sand paper or a polishing materials to surface sand or polish after the protruding object was cut off. Although not shown in the drawings specifically, one can see that any type of roughened surface, such as that found on a file, or any adherence of surface treatment papers, cloths or mesh bits may be optionally cut and adhered to cover the flush flange 12. Therefore, the protruding object could be cut off, and then the surface could be treated, sanded or polished in the same operation with the added materials. Among the many contemplated materials would include, but not be limited to, a roughened metal surface, sand paper of any size grit, polishing materials, shining lubricants on cloth or paper for polishing and shining, scuffing pads or the like.

The foregoing description of a preferred embodiment of the invention has been presented for purposes of illustration and description. It is not intended to be exhaustive or to limit the invention to the precise form disclosed. Obvious modifications or variations are possible in light of the above teachings with regards to the specific embodiments. The embodiment was chosen and described in order to best illustrate the principles of the invention and its practical applications to thereby enable one of ordinary skill in the art to best utilize the invention in various embodiments and with various modifications as are suited to the particular use contemplated. It is intended that the scope of the invention be defined by the claims which are appended hereto.

What is claimed is:

1. A tool bit, comprising:
   a flush cut grinder tool bit made of an elongated cylindrical shape;
   an inwardly facing saw blade within the inner diameter of the elongated cylindrical shape that can be sleeved over a protruding object, such that the cutting saw blade portion of the tool bit is inside the cylindrical tool bit so that when it is sleeved over a protruding object, moving the tool bit back and forth over the protruding object will cut the protruding object off.

2. The tool bit of claim 1, wherein the body of the drill bit terminates at its distal end with a flush flange having saw teeth therein.

3. The tool bit of claim 1, further comprising a bit shank suspended in the middle of a drill bit body by spokes radially extending from said bit shank.

4. The tool bit of claim 1, wherein said elongated cylindrical drill bit include a solid surface bottom having a roughened surface, much like the surface of a file or sandpaper to provide a final sanding of any remaining portion of the protuberance left over after the cutting operation.

5. The tool bit of claim 1, wherein said drill bit shank is adapted to be received into a conventional hand-held electric drill and secured by a traditional chuck.

6. The tool bit of claim 1, further comprising a chamfered bottom piece in order to cut into the protruding object, while also providing a bit of chamfering in order to countersink the ground protruding object.

7. A method of cutting off a protuberance from a surface, comprising:
   sleeving a cylindrical flush grinder drill bit having an inwardly facing saw blade over a protuberance and sliding said drill bit with inwardly facing saw blade from side to side to cut off the protuberance at the surface.

8. The method of claim 7, further comprising sanding any rough surfaces left behind after the cutting operation with a drill bit having a sanding surface on its bottom surface.

9. The method of claim 7, further comprising chamfering into the surface after the cutting operation with a drill bit having a chamfering surface on its bottom surface.

* * * * *